(12) United States Patent
Jain et al.

(10) Patent No.: US 6,987,751 B2
(45) Date of Patent: Jan. 17, 2006

(54) HYBRID MOBILE SWITCHING CENTER FOR COMBINED GSM/IS-41 COMMUNICATION

(75) Inventors: Nikhil Jain, San Diego, CA (US); Andrew T. Hunter, San Diego, CA (US); Herbert Vanhove, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/077,095

(22) Filed: Feb. 14, 2002

(65) Prior Publication Data

US 2003/0112785 A1    Jun. 19, 2003

Related U.S. Application Data

(60) Provisional application No. 60/340,448, filed on Dec. 14, 2001.

(51) Int. Cl.
*H04B 7/216*    (2006.01)

(52) U.S. Cl. .................... 370/342; 370/465; 455/432.1

(58) Field of Classification Search ................ 370/320, 370/328, 335, 342, 465–467; 455/432–433, 455/552
See application file for complete search history.

(56) References Cited

U.S. PATENT DOCUMENTS

| | | | |
|---|---|---|---|
| 6,233,463 B1 * | 5/2001 | Wiedeman et al. | 455/552 |
| 6,278,697 B1 * | 8/2001 | Brody et al. | 370/310 |
| 6,490,451 B1 * | 12/2002 | Denman et al. | 455/436 |
| 6,493,551 B1 * | 12/2002 | Wang et al. | 455/432.1 |
| 6,574,473 B2 * | 6/2003 | Rinne et al. | 455/436 |
| 6,681,111 B2 * | 1/2004 | Ahn et al. | 455/432.2 |
| 2002/0094811 A1 * | 7/2002 | Bright et al. | 455/433 |

\* cited by examiner

*Primary Examiner*—Chi Pham
*Assistant Examiner*—Thai Hoang
(74) *Attorney, Agent, or Firm*—Phil Wadsworth; Sandip "Micky" Minhas; Albert J. Hamois, Jr.

(57) ABSTRACT

A single CDMA radio access network is used in conjunction with both a GSM core and an IS-41 core using a hybrid MSC to support mobile stations having subscriptions in either the GSM core or IS-41 core without requiring more than a single subscription.

2 Claims, 1 Drawing Sheet

HYBRID MOBILE SWITCHING CENTER FOR COMBINED GSM/IS-41 COMMUNICATION

RELATED APPLICATIONS

This application claims priority from U.S. Provisional Patent Application Ser. No. 60/340,448, filed Dec. 14, 2001.

FIELD OF THE INVENTION

The present invention relates generally to wireless communication systems, and more particularly to systems that use a single CDMA radio access network with both a CDMA core network and a GSM core network.

BACKGROUND

Code division multiple access (CDMA) is a digital wireless technology that inherently has relatively greater bandwidth capacity, i.e., that inherently permits the servicing of more telephone calls per frequency band, than other wireless communication technologies. Moreover, the spread spectrum principles of CDMA inherently provide secure communications. U.S. Pat. No. 4,901,307, incorporated herein by reference, sets forth details of a CDMA system, which can be used to transmit both voice calls and non-voice computer data.

Despite the advantages of CDMA, other wireless systems exist that use other principles. For example, in much of the world GSM is used, which employs a version of time division multiple access.

Whether CDMA principles or other wireless principles are used, wireless communication systems can be thought of as having two main components, namely, the wireless radio access network (RAN) and the core infrastructure which communicates with the RAN and with external systems, such as the public switched telephone network (PSTN), the Internet (particularly although not exclusively for data calls), etc. The core infrastructures associated with the various wireless technologies can be very expensive, both in terms of hardware and in terms of developing communication protocols to support particularized, typically system-specific call switching, subscription and attendant authentication and call monitoring, and billing. Consequently, the communication protocols of one wireless system (in the case of GSM, GSM protocols, and in the case of CDMA such as cdma2000-1x, IS-41 protocols) may not be compatible with those of another system without expensively prohibitive alterations in the core infrastructure of one system or the other.

From the disclosure above, the present invention recognizes that it would be desirable to enable the use of a CDMA-based RAN, with its attendant advantages, not only with a CDMA core infrastructure but also with a GSM-based core infrastructure, because GSM is extant in much of the world. The present invention still further recognizes, in light of the above, the desirability of minimizing if not eliminating the need to modify the communication protocols of the GSM core infrastructure.

Still further, the present invention recognizes that a dual-mode mobile station that advantageously interfaces with a CDMA RAN might be provided to use a GSM core infrastructure when in, e.g., Europe, and to use a CDMA infrastructure while in, e.g., the United States. Unfortunately, heretofore such a mobile station would require a subscription and telephone number in the GSM system and a separate subscription and telephone number in the CDMA system. This increases both complexity and cost from a user's standpoint. The present invention recognizes that it would be desirable to permit use of a dual-mode CDMA mobile station without requiring a subscription in both a CDMA core and a GSM core.

SUMMARY OF THE INVENTION

A mobile switching center (MSC) is configured for supporting wireless communication between a code division multiple access (CDMA) radio access network (RAN) and both a GSM core infrastructure and an IS-41 core infrastructure. The MSC includes a first circuit communicating with the CDMA RAN and with the IS-41 core infrastructure using IS-41 protocol. Also, the MSC includes a second circuit communicating with the CDMA RAN and with the GSM core infrastructure using GSM protocol.

In a preferred embodiment, the first or second circuit is selected based on a message, such as a location message, from a mobile station (MS). The location message can include an international mobile subscriber identifier (IMSI), and the MSC can use the IMSI to determine in which core infrastructure the MS has a subscription.

In another aspect, a state machine mobile switching center (MSC) is configured for supporting wireless communication between a code division multiple access (CDMA) radio access network (RAN) and both a GSM core infrastructure and an IS-41 core infrastructure. The MSC includes a state machine that can be selectively configured to communicate with the IS-41 core infrastructure using IS-41 protocol or with the GSM core infrastructure using GSM protocol, based on an identifier received from a communicating MS.

In still another aspect, a communication system includes a CDMA RAN, a GSM core infrastructure, and a CDMA core infrastructure. An MSC interconnects the CDMA RAN with both infrastructures.

In yet another aspect, a method for effecting communication with a first wireless mobile station (MS) having a subscription in a GSM core infrastructure and with a second wireless MS having a subscription in a CDMA infrastructure without requiring either MS to have more than a single subscription includes receiving, at an MSC, an identifier from an MS. Based on the identifier, the method determines the core infrastructure in which the MS has a subscription. The method then undertakes, through the MSC, authentication with the MS using information from the core infrastructure in which the MS has a subscription. Accounting data is collected using the core infrastructure in which the MS has a subscription.

In another aspect, a mobile switching center for a wireless communication system includes means for receiving an identifier from an MS, and means for using the identifier to determine whether the MS has a subscription in a GSM core infrastructure or a CDMA core infrastructure. Means are provided for communicating with both core infrastructures.

In yet another aspect, a wireless mobile station (MS) includes a storage device that stores an identifier such as an IMSI. A radio associated with the MS communicates the identifier to a CDMA radio access network (RAN), and the MS has one and only subscription in a GSM core infrastructure.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
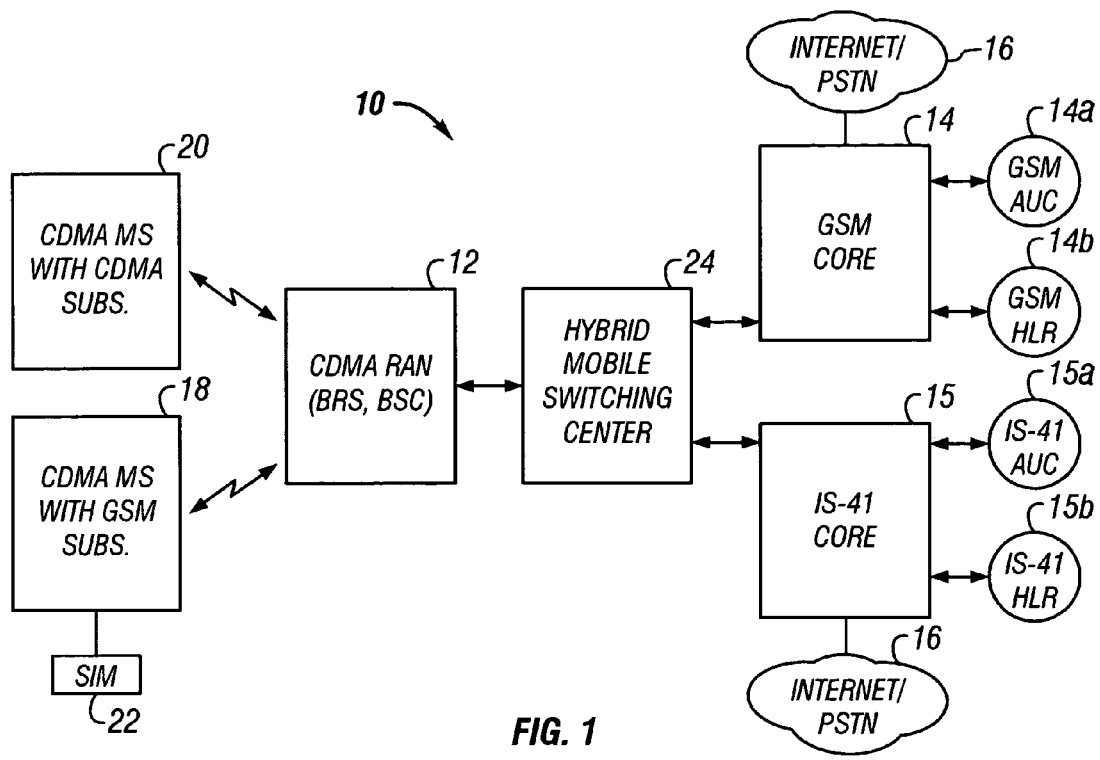
FIG. 1 is a block diagram of the present system for facilitating roaming between a GSM core infrastructure and a CDMA core infrastructure.

Referring initially to FIG. 1, a system is shown, generally designated 10, for facilitating communication, including voice and computer data communication, between a code division multiple access (CDMA) radio access network (RAN) 12 and both a GSM core infrastructure 14 and an IS-41 core infrastructure 15. In turn, the GSM core infrastructure 14 and IS-41 core infrastructure 15 can communicate with a data network such as a public switched telephone network (PSTN) and/or an Internet Protocol (IP) network 16, e.g., the Internet. The GSM core infrastructure 14 can include or can access a GSM authentication center 14a and a GSM home location register (HLR) 14b in accordance with GSM principles known in the art to authenticate subscriber mobile stations and to collect accounting and billing information as required by the particular GSM core infrastructure 14. Similarly, the IS-41 core infrastructure 15 can include or can access an IS-41 authentication center 15a and an IS-41 home location register (HLR) 15b in accordance with IS-41 principles known in the art to authenticate subscriber mobile stations and to collect accounting and billing information as required by the particular IS-41 core infrastructure 15.

In accordance with CDMA principles known in the art, the CDMA RAN includes base stations and base station controllers. The preferred CDMA RAN 12 shown in FIG. 1 uses cdma2000, and specifically uses either cdma2000 1x, cdma2000 3x, or cdma2000 high data rate (HDR) principles.

As shown in FIG. 1, the CDMA RAN 12 supports wireless communication with at least a GSM-enabled dual mode CDMA mobile station (MS) 18 and at least a single- or dual-mode CDMA MS 20. The GSM-enabled MS 18 can be engaged and disengaged with a subscriber identity module (SIM) 22 in accordance with GSM principles known in the art. In the illustrative embodiment shown in FIG. 1, the GSM-enabled MS 18 has a subscription in the GSM core infrastructure 14 but need not have a subscription in the IS-41 core infrastructure 15. In contrast, the IS-41 MS 20 has a subscription in the IS-41 core infrastructure 15 but need not have a subscription in the GSM core infrastructure 14.

In one non-limiting embodiment one or both of the MS 18, 20 are mobile telephones made by Kyocera, Samsung, or other manufacturer that use Code Division Multiple Access (CDMA) principles and CDMA over-the-air (OTA) communication air interfaces. The present invention, however, applies to other mobile stations such as laptop computers, wireless handsets or telephones, data transceivers, or paging and position determination receivers. The mobile stations can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

Figure 3:
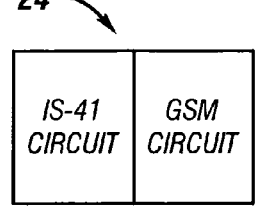
FIG. 3 is a schematic representation of one type of MSC of the present invention, which has an IS-41 circuit and a separate GSM circuit.
Figure 4:
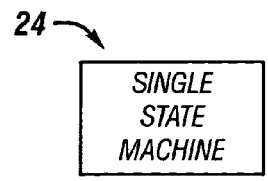
FIG. 4 is a schematic representation of a second type of MSC of the present invention, which has a single state machine that can selectively assume an IS-41 configuration or a GSM configuration.

Interconnecting each core infrastructure 14, 15 with the CDMA RAN 12 is a hybrid mobile switching center (MSC) 24. As set forth further below, the MSC 24 is a hybrid MSC, in that it uses GSM principles and protocols to communicate with the GSM core infrastructure 14 and IS-41 principles and protocols to communicate with the IS-41 core infrastructure 15. Referring briefly to FIG. 3, the MSC 24 can be implemented by a GSM MSC circuit that communicates with the GSM core infrastructure 14 when the below-described IMSI message indicates that a MS has a subscription in the GSM core infrastructure 14 and an IS-41 circuit that communicates with the IS-41 core infrastructure 15 when the below-described IMSI message indicates that a MS has a subscription in the IS-41 core infrastructure 15. In another non-limiting embodiment shown in FIG. 4 the MSC 24 is a single state machine, essentially a superset of a GSM MSC and an IS-41 MSC that selectively assumes a GSM state or an IS-41 state depending on the particular MS being served, as disclosed in detail below.

Figure 2:
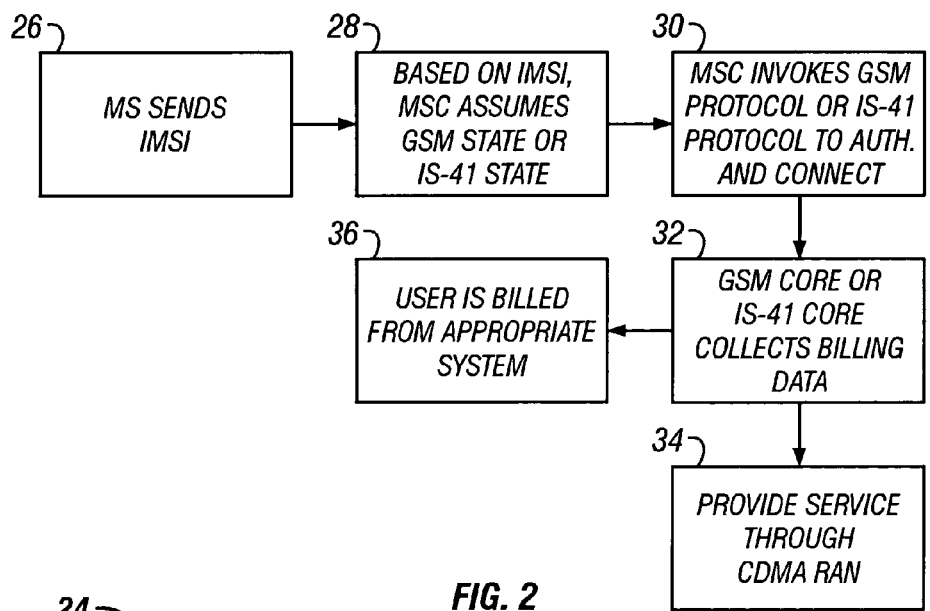
FIG. 2 is a flow chart of the logic of the present invention.

The logic of the system 10 and particularly of the MSC 24 can be seen in reference to FIG. 2. Commencing at block 26, one of the MS 18, 20 sends a message to the MSC 24 using the CDMA RAN 12, with the message including an identification of the MS such as an international mobile subscriber identifier (IMSI). The message sent by the MS can be, e.g., a location update message.

Proceeding to block 28, the MSC 24 determines based on the IMSI whether the communicating MS has a subscription in the GSM core infrastructure 14 or the IS-41 core infrastructure 15. One way to do this is to access a data repository associated with the MSC, with the repository correlating IMSIs with HLRs (and, hence, with their attendant cores). Another way is to communicate the IMSI to both the GSM core infrastructure 14 and the IS-41 core infrastructure 15, with the core to which the communicating MS belongs responding to the MSC 24.

In any case, at block 30 if the GSM-enabled MS 18 is the communicating MS, the preferred MSC 24 assumes its GSM state and authenticates the MS 18 using GSM protocols and authentication principles known in the art by accessing the GSM core infrastructure 14 and associated GSM AUC 14a and GSM HLR 14b. On the other hand, if the IS-41 MS 20 is the communicating MS, the preferred MSC 24 assumes its IS-41 state and authenticates the MS 20 using IS-41 protocols and authentication principles known in the art by accessing the IS-41 core infrastructure 15 and associated IS-41 AUC 15a and IS-41 HLR 15b. Accordingly, it may now be appreciated that the GSM-enabled MS 18 can authenticate itself through the MSC 24 with the GSM core infrastructure 14 while the MS 18 is located in an area otherwise serviced by the CDMA core infrastructure 15. Stated differently, the GSM-enabled MS 18 can roam from a GSM area to an IS-41 area and still be serviced without having a subscription in the IS-41 core.

At block 32, when the GSM-enabled MS 18 has been authenticated the GSM core infrastructure 14 collects accounting/billing data during the call, with the call being connected through the MSC 24 and service being provided at block 34. The user subsequently is billed using the GSM core infrastructure 14 at block 36. In contrast, when the IS-41 MS 20 has been authenticated the IS-41 core infrastructure 15 collects accounting/billing data during the call, with the call being connected through the MSC 24 and service being provided at block 34. The user subsequently is billed using the IS-41 core infrastructure 15 at block 36.

While the particular HYBRID MOBILE SWITCHING CENTER FOR COMBINED GSM/IS-41 COMMUNICATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A mobile switching center (MSC) configured for supporting wireless communication between a code division multiple access (CDMA) radio access network (RAN) and both a GSM core infrastructure and an IS-41 core infrastructure, comprising:

a first circuit communicating with the CDMA RAN, the first circuit communicating with the IS-41 core infrastructure using IS-41 protocol; and a second circuit communicating with the CDMA RAN, the second circuit communicating with the GSM core infrastructure using GSM protocol, wherein the MSC uses an International mobile subscriber identifier (IMSI) to determine in which core infrastructure a mobile station has a subscription.

2. A state machine mobile switching center (MSQ configured for supporting wireless communication between a code division multiple access (CDMA) radio access network (RAN) and both a GSM core infrastructure and an IS-41 core infrastructure, comprising:

a state machine selectively configurable to communicate with the IS-41 core infrastructure using IS-41 protocol or with the GSM core infrastructure using GSM protocol, based on at least one identifier received from at least one MS, wherein the MSC uses an International mobile subscriber identifier (IMSI) to determine in which core infrastructure a mobile station has a subscription, the MSC configuring itself accordingly.

* * * * *